United States Patent Office 2,782,239
Patented Feb. 19, 1957

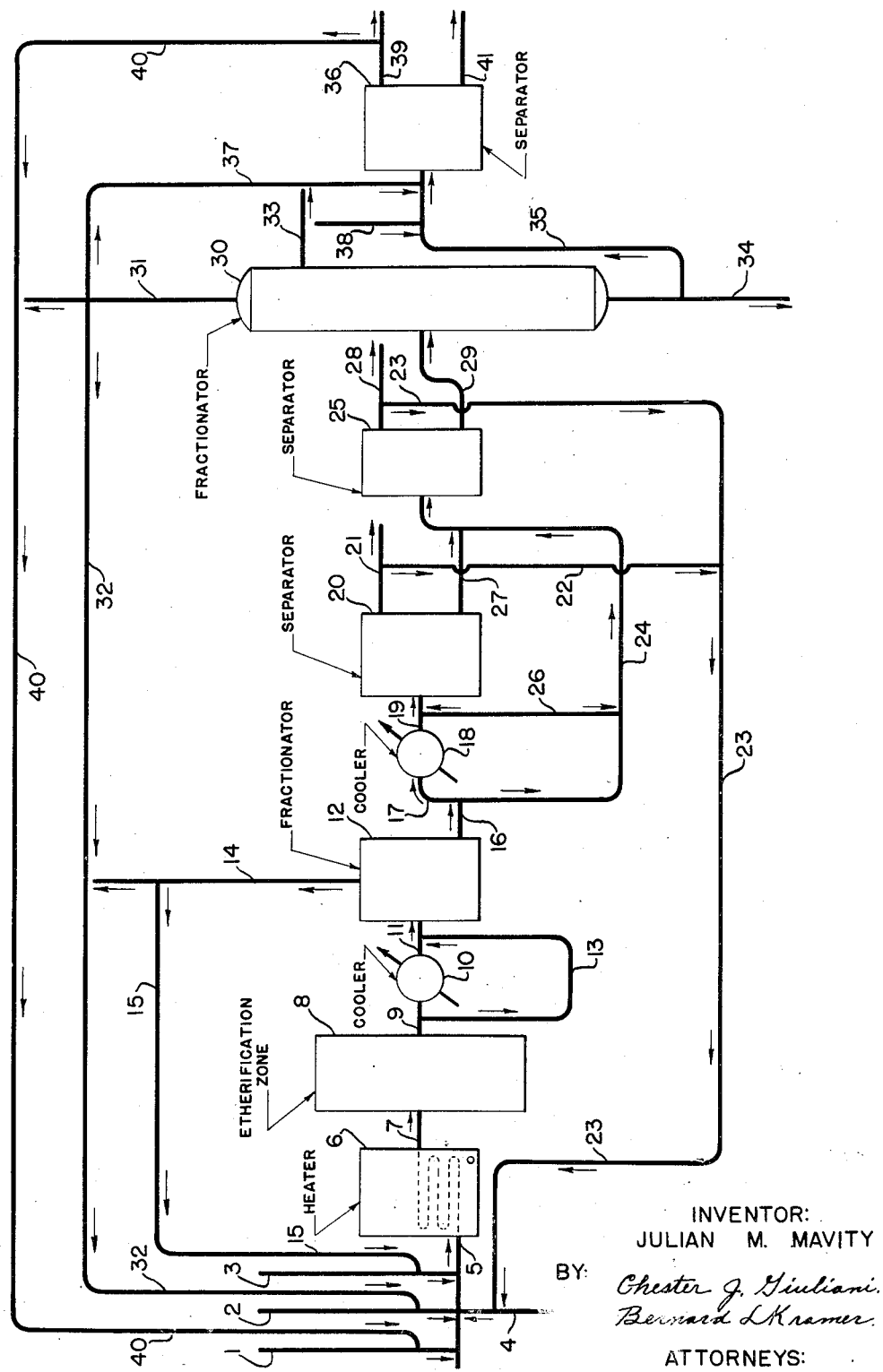

2,782,239

ETHERIFICATION OF HYDROXYAROMATIC COMPOUNDS

Julian M. Mavity, Hinsdale, Ill., assignor to Universal Oil Products Company, Chicago, Ill., a corporation of Delaware Application April 4, 1951, Serial No. 219,241

6 Claims. (Cl. 260—613)

This application is a continuation-in-part of my copending application Serial Number 167,479, filed June 10, 1950, now Patent No. 2,564,911, August 21, 1951, and relates to an improvement in the manufacture of alkoxyaromatic compounds by the reaction of a hydroxyaromatic compound with a dialkyl ether and/or an alcohol.

The reaction of a hydroxyaromatic compound with a dialkyl ether and/or alcohol is readily effected in the presence of a suitable catalyst. One method of effecting this reaction is by the use of a fixed bed of catalyst in a reaction zone and contacting the reactants with the catalyst at the desired reaction conditions. The use of a fixed bed of catalyst has the disadvantage of requiring periodic regeneration and/or removal of the catalyst after a period of time because the catalyst becomes less active during use and reaches a point where it is no longer satisfactory for the purpose intended. Another disadvantage is that the product tends to vary in composition as the run continues because the catalyst becomes less active in use, and this results in complications in the separation steps of the process when endeavoring to recover a final product of constant composition.

The present invention is directed to the use of the catalyst as a slurry or suspension in a suitable carrying medium whereby the catalyst is continuously introduced to and continuously withdrawn from the reaction zone. In this manner the conversion effected by the catalyst is maintained constant and the product similarly is of constant composition which, in turn, results in improved yields of the desired product and in improved operation of the separation steps of the process.

In one embodiment the present invention relates to the process for reacting a hydroxyaromatic compound and a reagent selected from the group consisting of a dialkyl ether and an alcohol in a reaction zone in the presence of finely divided catalyst carried as a suspension into said reaction zone, withdrawing reaction products and catalyst in commingled state from said reaction zone, and subsequently separating reaction products from catalyst.

In a specific embodiment the present invention relates to the process which comprises reacting hydroquinone and methanol in a reaction zone in the presence of finely divided silica-alumina catalyst carried as a suspension into said reaction zone, withdrawing reaction products and catalyst in commingled state from said reaction zone, separating unreacted methanol from other reaction products and catalyst, recycling at least a portion of the separated methanol to the reaction zone, subsequently separating the other reaction products from catalyst, and recovering p-methoxyphenol from said other reaction products.

In another specific embodiment the present invention relates to the process which comprises reacting hydroquinone with dimethyl ether in the presence of finely divided silica-alumina catalyst carried as a suspension in a hydrocarbon oil into the reaction zone, withdrawing reaction products, hydrocarbon oil and catalyst in commingled state from said reaction zone, separating dimethyl ether from the effluent products and recycling at least a portion thereof to said reaction zone, separating hydrocarbon oil from the effluent products and utilizing at least a portion thereof to carry additional catalyst into said reaction zone, separating catalyst from the effluent products, and separating p-methoxyphenol from the remaining effluent products.

The invention is described further in connection with the accompanying flow diagrammatic drawing which illustrates several specific embodiments thereof.

In the interest of simplicity, the drawing will be described in connection with the process for the preparation of p-methoxyphenol by the reaction of hydroquinone with methanol and/or dimethyl ether, which is a preferred embodiment of the present invention. It is understood that other suitable hydroxyaromatic compounds may be used in place of hydroquinone and may comprise, for example, phenol, alkyl phenols, such as cresol, xylenol, etc., dihydroxy benzenes including catechol, resorcinol and hydroquinone, as well as alkyl derivatives thereof, trihydroxy benzenes including pyrogallol, oxyhydroquinone and phluoroglucinol, as well as alkyl derivatives thereof, naphthol and polyhydroxy naphthols, as well as alkyl derivatives thereof, anthranol and polyhydroxy anthranols, as well as alkyl derivatives thereof, etc.

Similarly, in place of methanol, other suitable alcohols may be employed including ethanol, propanol, butanol, pentanol, etc. Suitable dialkyl ethers include dimethyl ether, diethyl ether, dipropyl ether, dibutyl ether, diamyl ether, etc. Where mixed alkoxyphenols are desired, alkyl ethers having different alkyl groups may be employed, such as methyl ethyl ether, methyl propyl ether, methyl butyl ether, methyl amyl ether, ethyl propyl ether, ethyl butyl ether, ethyl amyl ether, propyl butyl ether, propyl amyl ether, butyl amyl ether, etc. When desired, the alcohol and ether may be utilized simultaneously.

It is understood that, while the process of the present invention is applicable to the reaction of the different hydroxyaromatic compounds and the different alcohols and dialkyl ethers, the results obtained may not necessarily be equivalent and also that the operating conditions may have to be modified slightly as compared to the specific conditions described in connection with the drawing.

As hereinbefore set forth, the invention is particularly applicable to the reaction of hydroquinone with methanol and/or dimethyl ether to form p-methoxyphenol and the following description and drawing will be directed to this reaction. Referring to the drawing, hydroquinone is introduced to the process through line 1, methanol and/or dimethyl ether are introduced to the process through line 3, while catalyst is introduced to the process through line 4. Preferably a molar excess of alcohol and/or dialkyl ether is utilized, which may range from about 1 to 20 mols or more of alcohol per mol of hydroquinone or from about 0.5 to 10 mols or more of dialkyl ether per mol of hydroquinone. In a preferred embodiment of the process dimethoxybenzene is introduced into the reaction zone because this has been found to increase the amount of p-methoxyphenol formed in the process and to reduce the amount of dimethoxybenzene. The dimethoxybenzene may be introduced through line 2.

In one embodiment of the invention the catalyst introduced through line 4 is carried as a suspension in all or a portion of the reactants. When hydroquinone is utilized for this purpose it preferably is prepared as an aqueous solution thereof. In another embodiment of the invention an extraneous carrying material may be employed to transport the catalyst through the process. Any suitable extraneous carrying material may be employed for this purpose. A particularly preferred carrying material comprises a viscous hydrocarbon oil, preferably having a boiling range above the boiling point of p-methoxyphenol in order to permit ready separation of the oil from the reaction products in the subsequent separating steps of the process. The hydrocarbon oil should not undergo substantial decomposition or reaction under the conditions of the process and preferably is of paraffinic and/or naphthenic composition. Preferred oils include selected cuts of higher boiling hydrocarbon oils including mineral oil such as Nujol, lubricating oil, high boiling gas oil fractions, etc.

When the hydrocarbon oil is employed, a suspension of catalyst therein may be prepared by well-known means, not illustrated, and the suspension is introduced to the process through line 4. The commingled mixture of reactants and catalyst is directed through line 5 into heater 6, wherein the mixture is heated to the desired temperature, which may range from about 350° to about 700° F. and preferably from about 450° to about 650° F. The pressure employed will range from atmospheric to 3000 pounds or more per square inch and preferably from about 200 to 1500 pounds per square inch. The liquid hourly space velocity, defined as the volume of hydroquinone per hour per volume of reaction zone will range from about 0.05 to 5 or more.

It is understood that, in place of heating the total reactants and catalyst in commingled state as illustrated in the drawing, any or all of these streams may be heated individually or in any desired combination. The effluent from heater 6 is directed through line 7 to etherification zone 8. In another embodiment of the invention heater 6 may be omitted and etherification zone 8 may be heated to the desired temperature by any suitable means, not illustrated.

A particularly preferred catalyst for this reaction comprises a composite or association of silica and alumina, either synthetically prepared or naturally occurring. Of the naturally occurring catalysts, acid treated clays such as Filtrol, Tonsil, etc. are preferred. Other catalysts comprise solid dehydrating catalysts including the oxides of aluminum, thorium, tungsten, titanium, zirconium, molybdenum, chromium, etc., or mixtures thereof, either alone or together with the oxides of aluminum, magnesium and zinc, potassium carbonate, etc., or mixtures thereof. It is understood that these catalysts are not necessarily equivalent in their activity but that all of them are effective to catalyze the reaction.

The reaction of the present process readily is effected in the presence of a comparatively small proportion of catalyst and thus the process is particularly adapted to the use of the catalyst carried as a suspension into the reaction zone. The pounds of catalyst required per pound of hydroquinone generally will not be above about 0.5 and preferably is from about 0.01 to about 0.25 pound of catalyst per pound of hydroquinone.

Etherification zone 8 may comprise any suitable zone for effecting the desired reaction. The reactants and catalyst may be introduced to zone 8 in either upward or downward flow or each may be introduced at different points in the reaction zone. The effluent products are withdrawn from zone 8 in commingled state through line 9 and, in one embodiment of the invention, are directed through cooler 10 and line 11 to fractionator 12. When desired, cooler 10 may be omitted or bypassed by way of line 13. In any event, dimethyl ether, methanol and water, as may be present in the effluent products from zone 8, are separated in zone 12 and, while all or a portion may be removed from the process through line 14, at least a portion of the methanol and/or dimethyl ether is recycled by way of lines 15, 3 and 5 for further use in the process.

The remaining products are withdrawn from fractionator 12 by way of line 16 and, in one embodiment of the invention, are directed through line 17, cooler 18 and line 19 to separator 20, or through lines 16, 24, 26 and 19 to separator 20. These embodiments of the invention are utilized particularly when an extraneous oil is employed as a carrying material for the catalyst and, in separator 20, the oil is separated from the reaction products and catalyst. It has been found that at the proper temperature two liquid phases separate, the upper phase comprising hydrocarbon oil and the lower phase comprising p-methoxyphenol, dimethoxybenzene and hydroquinone. This separation preferably is effected at a temperature of from about 100° to about 350° F., which temperature is readily obtained by suitable control of the cooling steps of the process. The conditions to be employed in separator 20 may require modification when the process is utilized for the manufacture of different products. In the case here illustrated, oil separated in zone 20 is withdrawn through line 21 and, while all or a portion may be removed from the process, at least a portion preferably is recycled by way of lines 22 and 23 for further use in carrying catalyst into the reaction zone. In the event that dimethoxybenzene or other products are contained in the oil withdrawn through line 21, this stream may be treated in any suitable manner to separate the dimethoxybenzene or other products prior to recycle of the oil or the dimethoxybenzene and other products may be recycled to the reaction zone along with the oil.

When an extraneous oil is not employed for carrying the catalyst into the reaction zone, the effluent products withdrawn from fractionator 12 through line 16 may be passed directly through line 24 to separator 25 or, when desired, they may be passed through line 17, cooler 18, line 19 and line 26 into line 24 and then to separator 25. When an extraneous oil is utilized, the products separated from oil in separator 20 are withdrawn therefrom through line 27 and are directed through line 24 to separator 25. Separator 25 comprises any suitable means to separate the liquid products from the catalyst, and preferably comprises a suitable filtering operation, including rotary drum type filters, conventional filter presses, etc. Catalyst separated from the liquid products in zone 25 may be withdrawn from the process through line 28. When desired, all or a portion of the catalyst may be recycled for further use in the process by way of lines 23, 4, and 5 in suspension in oil or by other conventional means. In another embodiment of the invention, the catalyst may be treated in any suitable manner to reactivate the same prior to recycling to the process.

The liquid products separated from the catalyst in zone 25 will comprise dimethoxybenzene, p-methoxyphenol, hydroquinone and tar formed in the process. In the case here illustrated, the products are introduced by way of line 29 to fractionator 30. Fractionator 30 serves to separate dimethoxybenzene, p-methoxyphenol and a hydroquinone-tar fraction. It is understood that zone 30 may comprise one or a plurality of fractionators or other suitable methods to separate these products, and that the necessary heating, cooling and refluxing as required will be provided, as well as the necessary fractionating and contacting means such as bubble trays, bubble decks, side to side pans, etc. In the case here illustrated, dimethoxybenzene is withdrawn from the upper portion of zone 30 through line 31 and, while all or a portion thereof may be removed from the process, at least a portion of the dimethoxybenzene preferably is recycled by way of lines 32, 3 and 5 within the process for further use therein. p-Methoxyphenol is withdrawn from zone 30 through line 33.

The hydroquinone-tar fraction is withdrawn from zone 30 through line 34 and may be discarded or used in any suitable manner. In a preferred embodiment of the present invention the hydroquinone-tar fraction may be directed through line 35 into separator 36 and therein treated in any suitable manner to recover the hydroquinone for further use in the process. In a preferred method, dimethoxybenzene, preferably the dimethoxybenzene fraction is withdrawn from zone 36 by way of line 37, and water introduced through line 38 are commingled with the hydroquinone-tar fraction in separator 36 to recover hydroquinone. The hydroquinone separated in zone 36 is withdrawn therefrom through line 39 and, while all or a portion thereof may be withdrawn from the process, at least a portion thereof is recycled by way of lines 40, 1 and 5 for further use in the process, after removal of water if desired. A tar-dimethoxybenzene fraction is withdrawn from zone 36 by way of line 41 and may be discarded or treated in any suitable manner to recover the dimethoxybenzene. This separation may be effected by steam distillation, vacuum distillation, etc. or by extraction with a hydrocarbon or other suitable solvent. The recovered dimethoxybenzene may be recycled to either separation zone 36 or to etherification zone 8 as desired.

In the interest of simplicity, valves, pumps, and similar appurtenances have been omitted from the drawing and it is understood that they will be provided as required. Furthermore, it is understood that the separation steps of the process may be modified as desired. For example, the hydrocarbon oil, when employed, may be separated from the other products of the process before fractionator 12 or after separation of the catalyst in zone 25. Likewise, separation of a catalyst from the other components of the effluent products may be effected before separation of the other components or the catalyst may be separated as a final step in the process. In other words, the particular sequence of steps illustrated in the drawing comprises a preferred type of operation but the sequence may be suitably modified as desired within the broad scope of the present invention.

The following examples are introduced to illustrate further the novelty and utility of the present invention but not with the intention of unduly limiting the same.

*Example I*

12.5 grams of finely divided silica-alumina synthetically prepared catalyst containing 10% alumina and of a size passing 200 mesh was made into a suspension in 100 cc. of Nujol. Hydroquinone may be reacted with methanol in the presence of the suspension of catalyst in oil at a temperature of 550° F. and a pressure of 750 pounds per square inch. The effluent products, cooled in cooler 10 to a temperature of about 400° F. and the pressure reduced to about 300 pounds, are directed to fractionator 12, wherein dimethyl ether, methanol and water are removed as an overhead fraction and dimethyl ether and methanol are recycled within the process. The effluent products are cooled further in cooler 18 to a temperature of 250° F. and are directed to separator 20, wherein an upper oil phase separates from a lower liquid phase comprising p-methoxyphenol, dimethoxybenzene, hydroquinone, tar and catalyst. The upper oil phase is withdrawn and utilized further in the preparation of a suspension of catalyst therein. The lower phase is filtered in separator 25 to remove the catalyst from the liquid products, and the liquid products are fractionated to separate dimethoxybenzene, which is recycled in part within the process, p-methoxyphenol which is recovered as the final product of the process, and a hydroquinone-tar fraction. A portion of the dimethoxybenzene and water are commingled with the hydroquinone-tar fraction to separate a hydroquinone-water phase from a dimethoxybenzene-tar phase. Water is separated from the hydroquinone and the latter is recycled for further use in the process.

*Example II*

A suspension of acid treated clay in gas oil was prepared and this suspension may be utilized in the reaction of catechol with diethyl ether at a temperature of 600° F. and a pressure of 900 pounds per square inch. The products may be cooled and separated in the manner hereinbefore described to recover o-methoxyphenol from the other products of the process.

I claim as my invention:

1. The process which comprises reacting a hydroxyaromatic compound and a reagent selected from the group consisting of a dialkyl ether and an alcohol in a reaction zone at a temperature of from about 350° to about 700° F. and a pressure of from atmospheric to about 3000 pounds per square inch in the presence of a finely divided silica-alumina catalyst carried as a suspension into said reaction zone, withdrawing reaction products and catalyst in commingled state from said reaction zone, and subsequently separating reaction products from catalyst.

2. The process which comprises reacting hydroquinone and a reagent selected from the group consisting of a dialkyl ether and an alcohol in a reaction zone at a temperature of from about 350° to about 700° F. and a pressure of from about atmospheric to about 3000 pounds per square inch in the presence of finely divided silica-alumina catalyst carried as a suspension into said reaction zone in a concentration of from about 0.01 to about 0.5 pound of catalyst per pound of hydroquinone, withdrawing reaction products and catalyst in commingled state from said reaction zone, and subsequently separating reaction products from catalyst.

3. The process which comprises reacting a hydroxyaromatic compound and a reagent selected from the group consisting of a dialkyl ether and an alcohol in a reaction zone at a temperature of from about 350° to about 700° F. in the presence of finely divided silica-alumina catalyst carried as a suspension in a viscous hydrocarbon oil into said reaction zone, withdrawing reaction products and catalyst in commingled state from said reaction zone, and subsequently separating reaction products from catalyst.

4. The process which comprises reacting hydroquinone and a reagent selected from the group consisting of a dialkyl ether and an alcohol in a reaction zone at a temperature of from about 350° to about 700° F. in the presence of a finely divided silica-alumina catalyst carried into said reaction zone as a suspension in a viscous hydrocarbon oil, withdrawing reaction products and catalyst in commingled state from said reaction zone, and subsequently separating reaction products from catalyst.

5. The process which comprises reacting hydroquinone and methanol in a reaction zone at a temperature of from about 350° to about 700° F. in the presence of a finely divided silica-alumina catalyst carried into said reaction zone as a suspension in a hydrocarbon oil having a boiling range higher than that of p-methoxyphenol, withdrawing reaction products and catalyst in commingled state from said reaction zone, separating dimethyl ether, methanol and water from other reaction products and catalyst, recycling at least a portion of said separated dimethyl ether and methanol within the process, subsequently separating hydrocarbon oil from the other reaction products and catalyst, and recycling at least a portion of the hydrocarbon oil for further use in the process, subsequently separating liquid reaction products from catalyst, and thereafter treating the liquid reaction products to separate p-methoxyphenol, dimethoxybenzene and a hydroquinone-tar fraction.

6. The process of claim 5 further characterized in that at least a portion of the dimethoxybenzene is recycled to said reaction zone.

References Cited in the file of this patent

UNITED STATES PATENTS

| | | |
|---|---|---|
| 1,883,952 | Klarmann et al. | Oct. 25, 1932 |
| 1,966,635 | Marx et al. | July 17, 1934 |
| 2,045,560 | Fenske | June 23, 1936 |
| 2,067,960 | Werntz | Jan. 19, 1937 |
| 2,282,469 | Frolich | May 12, 1942 |
| 2,564,911 | Mavity | Aug. 21, 1951 |